United States Patent [19]

Ross et al.

[11] 4,057,232

[45] Nov. 8, 1977

[54] PRESS FOR SEPARATING MOLTEN METAL FROM DROSS

[75] Inventors: George P. Ross; James L. Bedortha, both of Steubenville, Ohio

[73] Assignee: National Steel Corporation, Pittsburgh, Pa.

[21] Appl. No.: 737,110

[22] Filed: Oct. 29, 1976

[51] Int. Cl.² ............................................. C22B 19/00
[52] U.S. Cl. ...................................................... 266/227
[58] Field of Search ............... 75/24, 30, 61, 63, 68 R, 75/86; 266/137, 201, 227, 232, 241, 287, 200

[56] References Cited

U.S. PATENT DOCUMENTS

| 563,769 | 7/1896 | Howard | 266/227 |
|---|---|---|---|
| 572,849 | 12/1896 | White | 100/213 |
| 783,893 | 2/1905 | Ribert | 100/213 |
| 1,136,837 | 4/1915 | Rochmill | 100/213 |
| 2,278,135 | 3/1942 | Osborn | 75/24 |
| 2,306,884 | 12/1942 | Jakovicz | 100/213 |
| 2,318,784 | 5/1943 | Koch | 100/213 |

*Primary Examiner*—Gerald A. Dost
*Attorney, Agent, or Firm*—Shanley, O'Neil and Baker

[57] ABSTRACT

A dross press is provided for separating molten zinc from the dross scooped from the top or from the bottom of a molten bath of zinc in a zinc pot used in a zinc coating process. The press is mounted above the molten metal pool in the pot in a position so that zinc may be expressed from the dross that has been collected in a hand ladle to be squeezed through the perforations in the ladle to fall into the pool maintained in the zinc pot. Alternatively, the press may be mounted so that the reclaimed metal is expressed through the perforations into other receptacles, including molds suitable for weighing, sampling, etc.

4 Claims, 2 Drawing Figures

PRESS FOR SEPARATING MOLTEN METAL FROM DROSS

BACKGROUND OF THE INVENTION

Dross must be removed from the coating bath used in a galvanizing operation to prevent the formation of imperfections in the coating that might otherwise take place if impurities floating on the molten pool or sunk to the bottom were to deposit out in the coating. The collection of dross to remove it from the bath and subsequent pressing of the dross to remove molten metal entrained therewith is known generally as shown in the U.S. Pat. No. 2,278,135 to Osborn, Mar. 31, 1942. In this patent, dross is lifted in baskets that dip into a molten metal bath and any molten metal entrained with the dross is freed by pressing the dross with flat headed pistons in closed cylinders to free some of the entrained molten metal that flows back into the larger molten bath of metal while the cylindrical press cakes formed of the solid dross and some of the retained molten metal are removed on suitable collection platforms for further treatment by higher pressure or chemical treatment or are simply held in storage for subsequent refinement to recover the valuable metal component thereof.

Also, it is known to remove entrained molten metal from metal slags or dross by agitating the slag with stirring rods as described in U.S. Pat. No. 1,559,803 to Stout, Nov. 3, 1925. This particular disclosure is concerned with removing molten metal from slag by contacting iron bars having a relatively high melting point, with copper slag for example, that has a melting point lower than that of the iron bars to procedure a reaction with the exposed surfaces of the bars and certain ingredients of the slag to precipitate copper from the slag. The molten copper that is released in the material being agitated, precipitates out to settle to the bottom of the container holding the slag, to be drawn off, the desired copper precipitating reaction is expedited by agitating the iron rods throughout the body of slag.

SUMMARY OF THE INVENTION

The dross press shown herein may have more general application but is preferably adapted for use in association with a molten body of zinc that is maintained in a zinc pot for use in a steel sheet galvanizing process. The dross press may be mounted in a position over the molten zinc bath in the pot and when an accumulation of dross is noted on or under the surface of the molten zinc body in the pot, the dross may be scooped up in a manually controlled ladle to be processed in the press. The molten metal expressed from the dross falls into the zinc pot or other receptacle while the residue of dross is disposed of.

The dross press of the present invention comprises a source of power, ram means arranged to be driven from the source, a ladle means having a perforated wall adapted to contain the dross to be pressed, support means for said ram and ladle means, the support means being arranged to hold the ladle means in a fixed position relative to reciprocating movement of the ram, a drive shaft for the ram connected to the source of power, a ram head connected to the drive shaft, the ram head having a downwardly facing convex external surface, the ladle means wall having an upwardly facing concave internal surface complementary in shape to the convex surface of the ram head, the convex surface of the ram head and the concave wall surface of the ladle means being aligned for concentrically interfitting relationship when the ram head is forcibly driven into a mass of dross and molten metal in the ladle and shaped to work the mass to coalesce the vestiges of molten metal in the dross to form droplets by applying pressure against the dross and molten metal constituting the mass to force the molten metal through the perforations in said wall, and means disposed below the ladle means to collect molten metal expressed from the mass of dross.

It is therefore an object of this invention to provide an improved dross press for removing substantially all of the molten metal content from dross scooped from a bath of molten metal.

Another object of the invention is to provide an improved dross press for use with the zinc pot of a galvanizing coating line.

Another object is to provide an improved pressing means for extracting molten zinc from the dross scooped from a molten body of zinc maintained in a zinc pot of a galvanizing operation.

Other objects will appear from the description below.

DRAWING

FIG. 1 is a view in side elevation partly in section showing the press of this invention fixedly supported by a wall of a zinc pot over the bath of molten zinc used in a galvanizing process, and FIG. 2 is a fragmentary view in side elevation of a portion of the embodiment of FIG. 1 but showing modified press elements.

DETAILED DESCRIPTION

Figure 1:
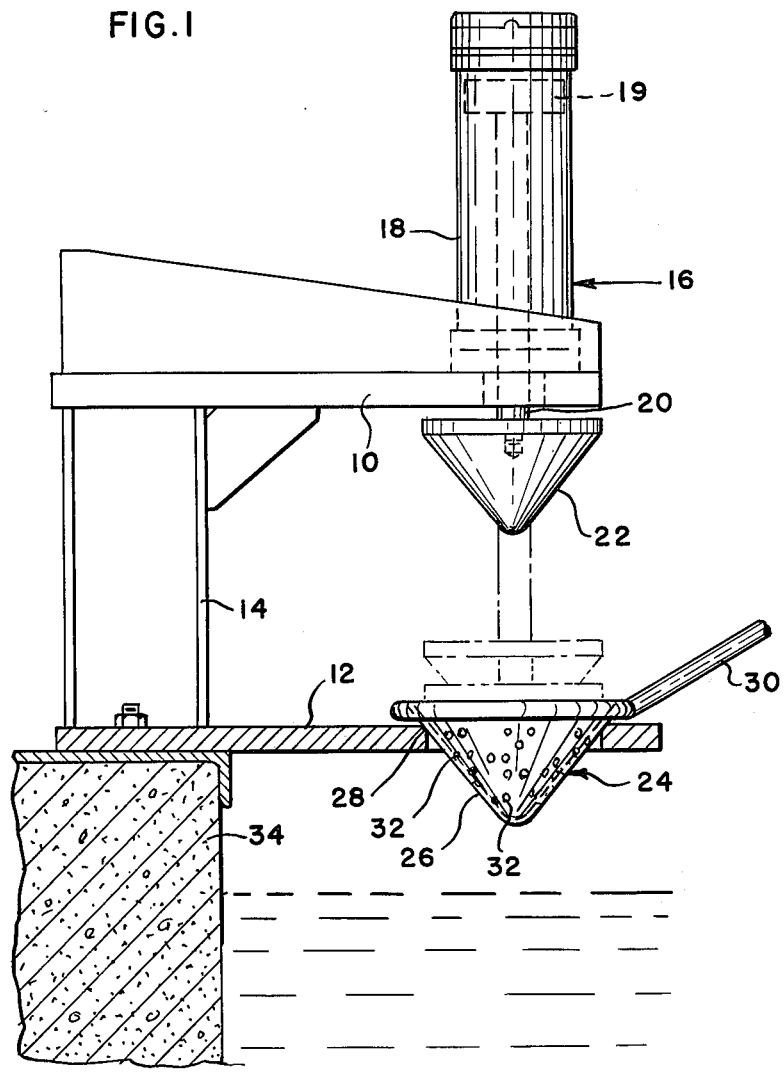

The dross press here shown includes a ladle having a concavely shaped interior that cooperates with a convexly shaped ram head. The cooperating pressing elements cause the dross to be worked continuously as it is being spread out in the ladle by the motion of the ram head during the pressing operation so that the small vestiges of molten zinc entrained in the mass of dross scooped from the bath of molten metal are caused to coalesce into droplets. As the working of the dross mass continues, the spreading of the dross and the pressure continues to increase against the more or less plastic mass in the ladle, and the coalesced droplets of molten metal are forced out of body of the dross to flow through apertures in the wall of the ladle to fall back into the molten body of metal in the zinc pot or other receptacle. Due to the controlled spreading action and buildup of pressure in the mass of dross in the ladle, nearly all of the entrained molten metal is forced to flow back into the receptacle and the solid constituents of the dross are retained in the ladle to be removed. With the use of the convexly shaped ram head and correspondingly concavely shaped ladle to work the dross while applying pressure thereto, substantially all the molten metal content of the dross is quickly removed so that the stripped dross may be salvaged and need not be reworked to recover any retained zinc as has been required when using the known devices.

The dross press of this invention is supported in a rigid substantially C-shaped frame having an upper arm 10, a lower arm 12 supported from the vertical back element 14. The C-frame may be mmade as a weldment or casting that is suitably reinforced to support the very heavy loads imposed upon the press frame when the molten metal is being stripped from the dross in the manner that will appear more fully below.

The upper arm 10 supports a power driven ram means 16 at its free end, this pressing means including a pressurized fluid motor having a cylinder 18 supplied with pressure fluid from a suitable source of power in the form of pump means, not shown. The cylinder encloses a piston 19 at the upper end of a piston rod or drive shaft 20 that reciprocates along a path having a generally vertical axis. A ram head 22 is fixed to the lower end of the piston rod 20, the ram head being formed with a downwardly facing convex external surface which may be of conical shape, as shown in the drawing.

The ram head is adapted to cooperate with a ladle means 24 that has a basket portion 26, the inner surface of which is illustrated as having a generally conical configuration to substantially concentrically receive the complementarily shaped ram head 22. The ladle is adapted to be supported in a seat 28 formed at the outer end of lower arm 12 to hold the ladle vertically under and in axial alignment with the axis of movement of the driven shaft 20 and ram had 22. The ladle is provided with a suitable handle means 30 by which the ladle may be manually manipulated. It will be recognized that where desired a separate ladle can be used to collect the dross, the contents of this ladle being emptied into the basket 26 for expression of the molten metal from the mixture of dross and molten metal scooped up by the separate ladle. The complementary shapes of the ram head 22 and ladle basket 26 are designed to interfit with the ram head substantially entirely received within the basket. The ladle is provided with a plurality of apertures 32 which, as will appear more fully below, permit molten metal to escape from the basket when the ram head is driven into a charge of dross and molten metal supported in the basket.

The C-frame is fixedly mounted on a rigid upright wall 34 of the zinc pot to hold the hydraulic motor and ram head assembly at the end of the arm 10 in position over the ladle when the ladle is placed in seat 28 at the free end of support arm 12. The C-frame is positioned on the wall to hold the assembled dross press over the molten bath of zinc or receptacle so that molten metal stripped from the dross in ladle 24 will fall downwardly into the molten zinc bath or receptacle.

In use, the ladle 24 may be manipulated by handle 30 to skim or scoop the dross from the molten zinc coating bath or to scoop up dross from the bath which has been skimmed and collected using some other skimming means. The dross thus skimmed and/or scooped from the molten bath and collected in the basket 26 of the ladle is quickly transported to the press and the ladle is centered in seat 28. When the ladle filled with dross is positioned under the ram, suitable control means, not shown, may be operated to deliver pressure fluid above the piston 19 in cylinder 18 to drive the ram head 22 into the mass of dross in basket 26. As the conical tip of the ram head enters the mass of dross, a portion of the dross is pushed aside so that there is an agitation of or working of the different portions of the mass of the dross relative one to another and as the pointed end of the ram head continues its downward thrust into the dross and the conical body of the ram pushes into the mass to continue the rolling action of the different zones of the mass of dross against one another, the whole mass is agitated.

Normally, in the dross scooped up from the molten body of zinc, vestiges of molten zinc are distributed throughout the mass of the body of dross. Considerable amounts of the small particles of molten zinc would tend to remain trapped in the dross but for the agitation provided by the spreading, rolling and compressing action produced when the conical ram head enters the spongy mass formed of dross and the residual molten zinc contained therein. However, due to the working of one zone of the mass of dross against other zones, these small particles of molten metal are simultaneously agitated and rolled together during the movement of the ram head through the mass of dross whereby the vestiges of molten metal are caused to coalesce to form larger bodies of molten metal. As the mass of dross is gradually compressed and spread out into a thin layer of dross around the inside surface of basket 26, the increasing area of pressure and the increasingly larger bodies of molten metal that are formed by coalescing the tiny molten particles cause the molten zinc to be expressed from the sponge-like mass of dross through apertures 32 to fall into the body of molten zinc in the zinc pot or receptacle.

Figure 2:
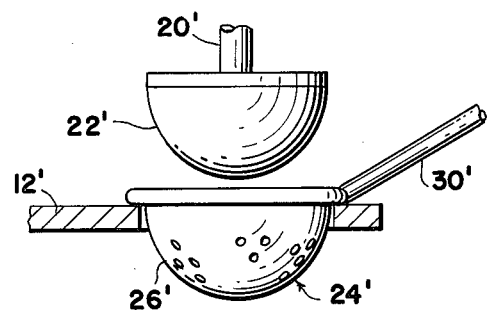

Referring to FIG. 2, wherein the same reference numerals are used for similar parts but with the reference numerals primed, basket 26' is of semi-spherical shape as is also ram head 22'. This modified shape accomplished the same purposes as the conical shape of FIG. 1, namely, to work the mixture of dross and molten metal downwardly and outwardly to cause the vestiges of molten metal to coalesce and form droplets which are forced out through perforations or apertures 32' in the walls of basket 26'.

While we have described the preferred form of this invention in association with a zinc pot for use in a galvanizing operation, it is possible that the apparatus can be adapted for use in other procedures where molten metal must be stripped from a slag or the like and it is possible that modification of this invention may occur to those skilled in the art that will fall within the scope of the following claims.

We claim:

1. In a power driven press for separating molten metallic zinc from dross in the operation of a zinc-coating apparatus for coating metal and having a zinc pot for containing a molten zinc bath through which the metal to be coated is drawn, a source of power in the form of a pressurized fluid motor having a piston reciprocable in the cylinder, ram means arranged to be driven from the source, a ladle in the form of a skimmer including an elongated handle to enable hand-manipulation to collect and contain dross to be pressed, the skimmer having a perforated wall defining a convex outer surface, support means in the form of a rigid C-frame for the ram and ladle, the lower arm of the C-frame having a ring-shaped seat therein having a surface substantially complementary to an outer surface portion of the skimming vessel and arranged to removably support the ladle on the C-frame in a fixed position under the ram, a drive shaft for the ram reciprocably mounted in the upper arm of the C-frame and connected to the piston of the power source for reciprocably moving the ram toward and away from the ladle supported thereunder, a ram head connected to the drive shaft, the ram head having a downwardly facing convex external surface, the perforated wall having an upwardly facing concave internal surface substantially complementary in shape to the convex surface of the ram head, the convex surface of the ram head and the concave wall surface of the ladle being arranged for concentrically interfitting relationship when the ram head is forcably driven into a mass of dross and molten zinc metal in the ladle and shaped to work the mass upwardly between the adjacent surfaces of the ram head and ladle to coalesce the vestiges of molten metal in the dross to form droplets by applying pressure against the dross and molten metal constituting the mass to force the molten metal through the perforations in the ladle wall, and means rigidly mounting the C-frame on the zinc pot with the seat thereon extending over the pot whereby molten zinc metal expressed from the mass of dross is collected in the pot.

2. The apparatus as claimed in claim 1 in which the surfaces of the ram head and the ladle means are substantially conical in shape.

3. The apparatus as claimed in claim 1 in which
the surfaces of the ram head and the ladle means are semi-spherical in shape.

4. The apparatus as defined in claim 1 wherein the zinc pot is defined by rigid upwardly extending walls, and wherein the C-frame is rigidly mounted on one of the walls of the zinc pot.

* * * * *